Jan. 12, 1937. A. C. ZIMMERMAN ET AL 2,067,808
WATER SOFTENING APPARATUS
Filed June 26, 1933 5 Sheets-Sheet 2

Fig. 2.

INVENTORS
ARTHUR C. ZIMMERMAN,
FRANK E. KNAACK.
BY
Toulmin & Toulmin
ATTORNEYS

Patented Jan. 12, 1937

2,067,808

UNITED STATES PATENT OFFICE 2,067,808

WATER SOFTENING APPARATUS

Arthur C. Zimmerman and Frank E. Knaack, Dayton, Ohio, assignors to The Duro Company, Dayton, Ohio, a corporation of Ohio Application June 26, 1933, Serial No. 677,566

26 Claims. (Cl. 210—24)

This invention relates to improvements in water softening apparatus, and has for its object to provide, in connection with a water softener, a passageway for water including a softening tank, mechanical means for cutting off the passageway and diverting a part of the water therefrom with brine to regenerate the material in the softening tank, and automatically operated means for refilling the brine tank, rinsing the softening tank and opening the passageway.

It is also an object of this invention to provide, in connection with a water softener having a water passageway including a softening tank, means to by-pass part of the water from the passageway to cut off the passageway and to cause brine to pass through the softening tank, and automatically operated means for by-passing an additional part of the water for refilling the brine tank and rinsing the softening tank, and finally opening the passageway, said automatic means being controlled in its operation by the quantity of liquid in the brine tank.

A particular object of this invention is to provide a water softening system which can be started on a cycle of regeneration, washing, brine refill and restoration of the apparatus to softening position by the movement in one direction of a handle. Such handle may be operated manually or otherwise, and either directly from the machine or remotely.

It is our object to provide a machine that when the handle is once set thereafter the timing of the period of applying the brine will depend upon the amount of brine that is applied; and the period of washing will depend upon the amount of refill water that is necessary to restore the brine to its original quantity; and the completion of the restoration of the refill water will restore the system automatically to its softening position.

These and other objects will appear from the following description taken in connection with the drawings.

Referring to the drawings.

Figure 1:
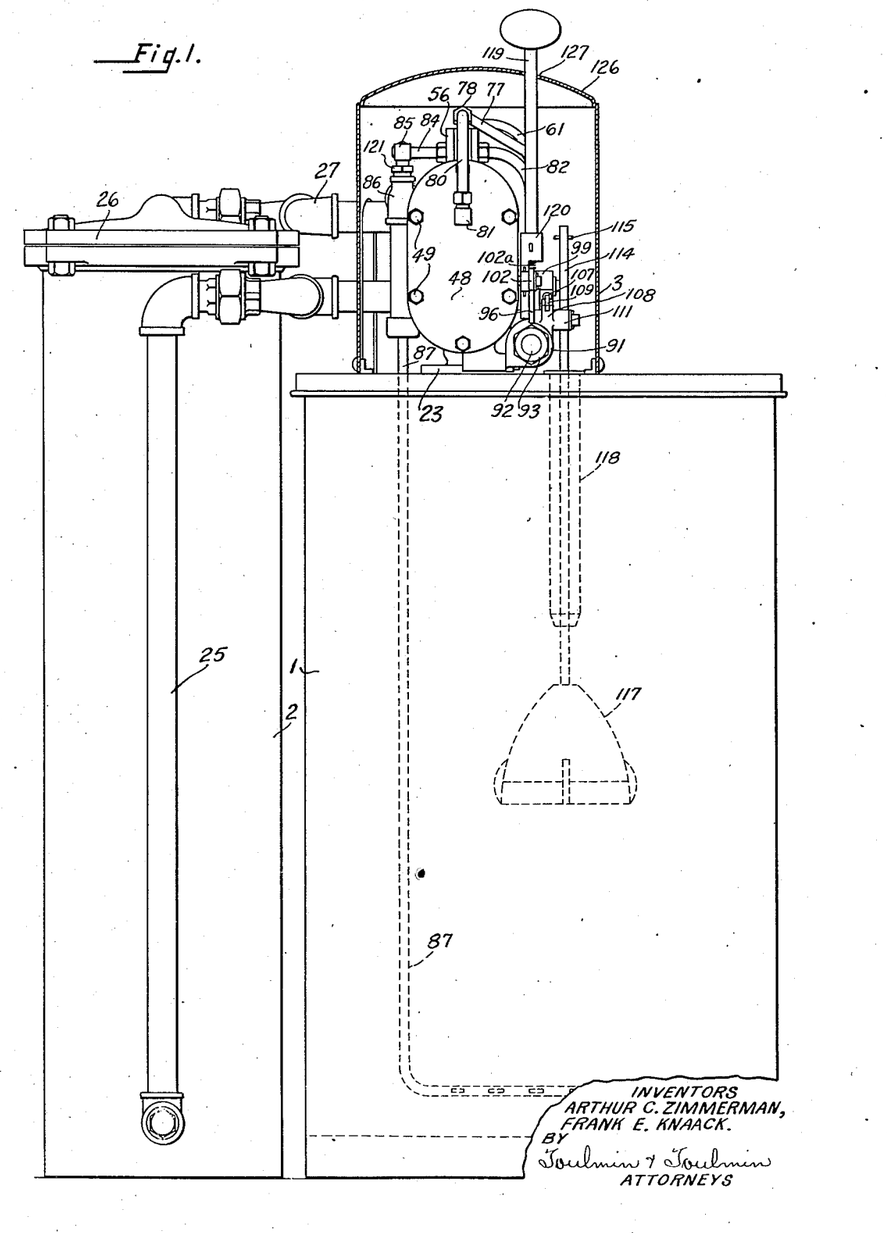
Figure 1 is an elevation of the softening tank and the brine tank, with the operating mechanism associated therewith located on top of the brine tank.
Figure 2:
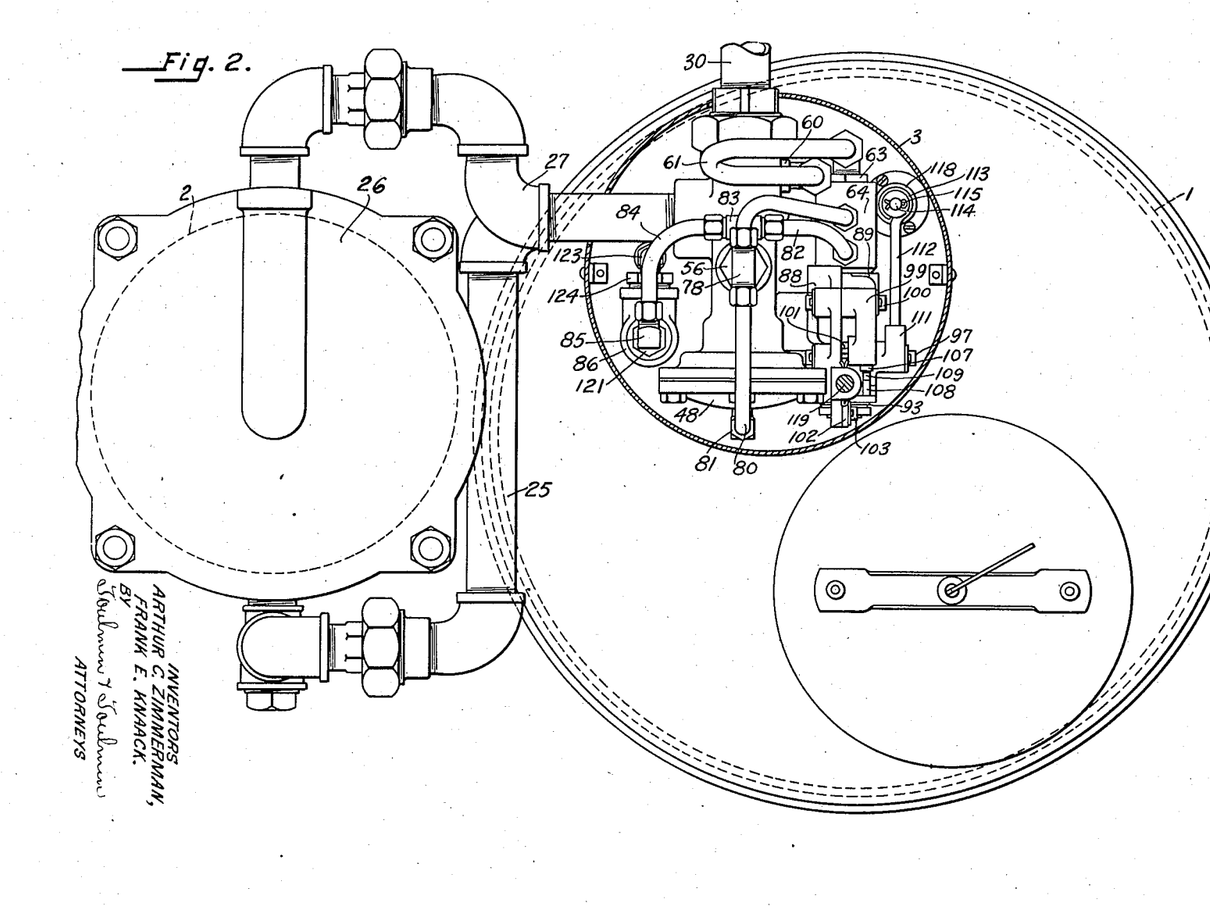
Figure 2 is a top plan view of the softening apparatus.
Figure 3:
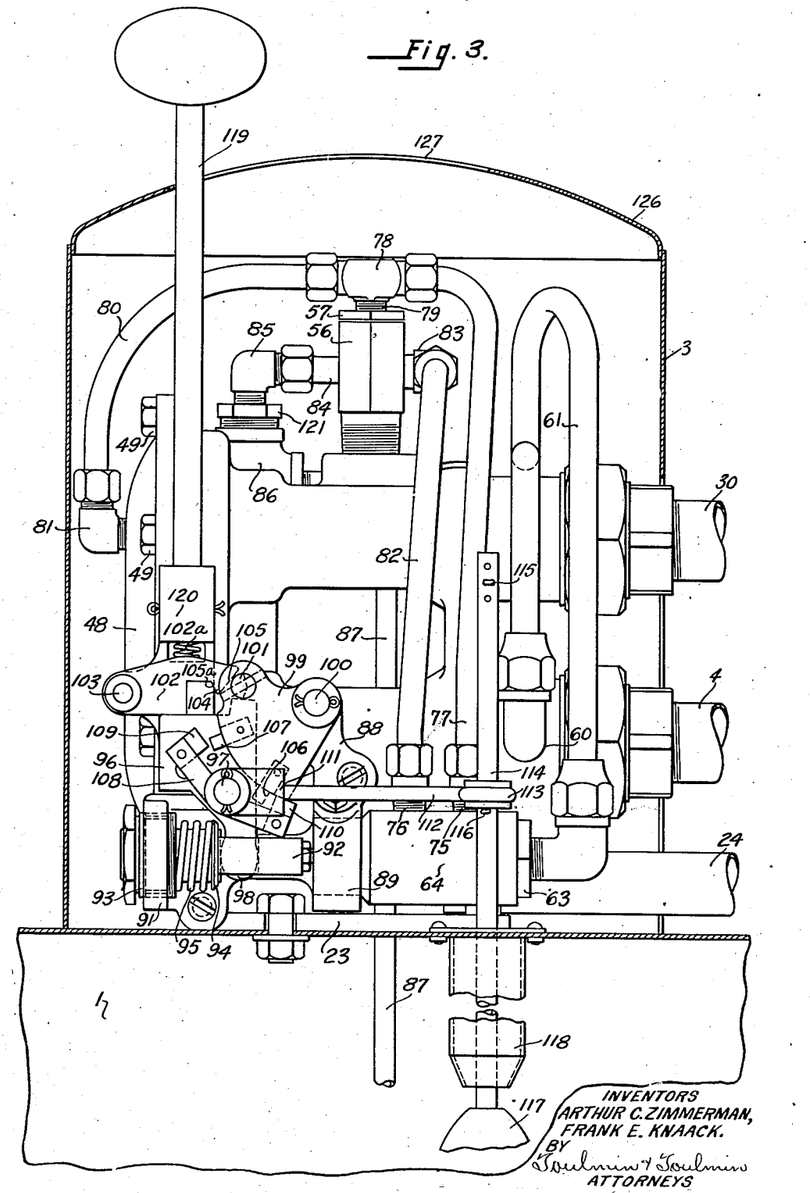
Figure 3 is a vertical section through the casing located on top of the brine tank and inclosing the operating mechanism, and showing in elevation the operating mechanism.

The brine tank, indicated by the numeral 1, is located adjacent a softening tank 2 and is connected therewith by suitable pipes. These tanks are made of sheet metal, and on top of the brine tank is located a valve casing 3, which has connected thereto a hard water pipe 4 which opens into an inlet passageway 5 leading into a valve chamber 6. From this valve chamber leads a drain passageway 7.

Figures 4, 5:
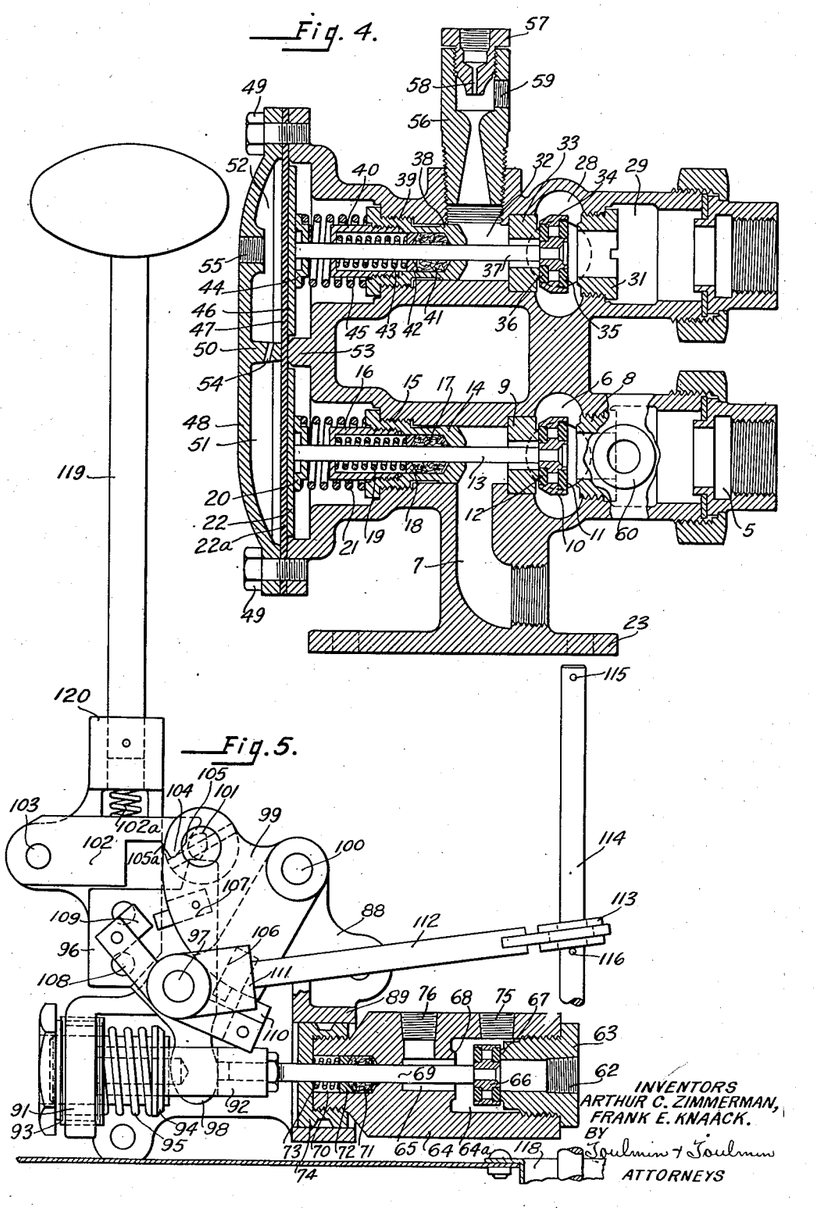
Figure 4 is a section through the valve mechanism operated to control the direction of the flow of the water.
Figure 5 is a side elevation of the control mechanism showing a part thereof in section, with the operative parts in position for softening purposes.

Around the inlet passageway and adjacent the valve chamber is a valve seat 8, while around the drain-passageway and adjacent the chamber is a valve seat 9. Between these two valve seats is a valve 10, which has on one face a gasket 11 to engage the valve seat 8, and on the other face a gasket 12 adapted to engage the valve seat 9.

Extending from the valve is a valve stem 13, which extends in a direction opposite the inlet passageway and through a casing composed of a part 14 threaded at 15 into the valve casing and into which is threaded a second part 16.

In the part 14 is a packing 17 around the valve stem. This packing is forced into close engagement with the bottom of the part 14 and with the valve stem by means of a gland 18 and a spring 19 between the gland and the closed end of the part 16. On the end of the stem remote from the valve is a head 20, which has between it and the open end of the part 14 a spring 21, which tends to hold the valve in the position shown in Figure 4. On this head is a disc 22, which is engaged by a diaphragm 22a. The valve casing is supported on the brine tank by means of a fitting 23.

Extending from the drain passageway is a drain pipe 24. Extending from the chamber 6 to the bottom of the softening tank 2 is a pipe 25. The softening tank is closed at its top by means of a top 26, from which a pipe 27 extends to the valve chamber 28 in the casing opposite the valve chamber 6. From this chamber 28 a soft water outlet passageway 29 leads into an outlet 30 to which a service pipe is attached. Around this passageway adjacent the valve chamber 28 is a valve seat 31.

Leading from the chamber 28 is a passageway 32 which has around it adjacent the chamber a valve seat 33. In the valve chamber 28, between the two seats, is a valve 34, which has on one face a gasket 35 to engage the valve seat 31, and on its other face a gasket 36 adapted to engage the valve seat 33. Extending from the valve is a valve stem 37, which passes through a casing composed of a cup-shaped part 38, threaded at 39 to the casing, and a second cup-shaped part 40 threaded into the first part. In the bottom of the first part, around the valve stem, is a packing 41 held in place by means of a gland 42 and a spring 43 between the gland and one end of the part 40 of the casing.

On the valve stem is a head 44, which has between it and the open end of the part 38 a spring 45 normally holding the valve against the valve seat 33. On this head is a disc 46 which is engaged by a diaphragm 47. This diaphragm is continuous with and forms a part of the diaphragm 22a, and is held on the casing by means of a cap 48 and screws 49 passing through the cap into the valve casing. The cap has therein a partition 50, dividing the cap into two chambers 51 and 52.

This partition cooperates with a projection 53 on the valve casing to clamp the diaphragms between the two chambers. In the partition is a hold 54 to provide communication from one chamber to the other. In the cap there is provided an inlet passageway 55 into the chamber 52. The fluid admitted through this passageway into chamber 52 may pass into chamber 51 through the hole 54.

Threaded into the valve casing and about the passageway 32 is an injector casing 56, which has intermediate its ends a venturi passageway, and at its outer end an enlarged opening into which a plug 57 is threaded. This plug has a restricted passageway 58 to direct water into the Venturi passageway and through the passageway 32. In one side of the injector casing is an inlet opening 59.

Extending from the passageway 5 in the valve casing 3 is an outlet 60, to which is attached one end of a pipe 61, the other end of the pipe being threaded into a hole 62 in the plug 63, threaded into one end of a second valve casing 64. This plug forms with the valve casing a chamber 64a. The hole 62 forms an inlet into this casing. Adjacent the casing and in line with the hole 62 is a restricted extension 65 of the chamber 64a. In the chamber 64a is a valve 66 adapted to engage a seat 67 on the plug 63, and a seat 68 on the valve casing around the restricted extension of the chamber 64a.

Extending from the valve and through an opening provided therefor in the valve casing is a valve stem 69. In the end of the valve casing remote from the plug 63 is a small chamber 70, in which a packing 71 is provided around the stem. This packing is held in place by means of a gland 72 and a spring 73. This spring is held against the gland by means of a cap 74 threaded on the end of the valve casing. From the chamber 64a is an outlet 75, while from the extension there is an outlet 76.

From the outlet 75 a pipe 77 extends to a T-coupling 78. This T-coupling is threaded into the plug 57 by means of a threaded projection 79. A pipe 80 connected at one end to the T-coupling 78 extends to and is connected at its other end to a fitting 81 threaded into the inlet passageway 55 in the cap 48. A pipe 82 connected at one end to the outlet 76 extends to and is threaded at its other end in a T-fitting 83, which is threaded in the inlet 59 of the injector casing. Extending from the T-fitting is a pipe 84 connected at one end to this fitting and at its other end to a fitting 85, threaded into a plug 121 in the upper end of a dirt trap 86, suitably supported at one side of the valve casing 3. The numeral 87 indicates a brine line extending from within the brine tank to the dirt trap. The nature of the connection between the brine line 87 and the dirt trap will be later described.

Attached to the cap 74 by means of a sleeve 89 is a valve bracket 88 through the instrumentality of a screw 90, or other suitable attaching means. This valve bracket has thereon, in line with the sleeve, a ring member 91, which supports one end of a plunger 92 carried in a sleeve 93 adjustably attached to the ring. On this plunger is a shoulder 94 engaged by one end of a spring 95, which engages at its other end with the sleeve 93. This spring acting on the plunger, and through the plunger on the valve stem 69, tends to hold the valve in engagement with the valve seat 67, as shown in Figure 5. When in this position the softening apparatus is operating for softening purposes.

The plunger has therein a slot in which a projection 98 of a lever bracket 96 fits. This lever is pivoted at 97 to the valve bracket 88. Subtantially above the sleeve 89 an arm 99 is pivoted at 100 on the valve bracket 88. On this arm is a pin 101 adapted to be engaged by a pawl 102, pivoted at one end at 103 to the lever bracket 96. This pawl is urged downwardly by means of a spring 102a.

On the other end of the pawl remote from the pivot 103 is a hook 104, which has a cam surface 105 on the end of the pawl, and a second inclined cam surface 105a forming a pin-engaging surface. On the arm 99 is an escapement pin 106, located adjacent the sleeve 89, and another escapement pin 107 is located on the arm 99 adjacent the pin 101. Pivoted on the pivot 97 of the lever bracket is an escapement lever 108, which has on one end a pallet 109 adapted to engage the escapement pin 107, and on its other end a pallet 110 adapted to engage the escapement pin 106.

On the escapement lever is a socket member 111, which supports one end of a float lever 112. On the other end of this float lever are two washers 113, which receive a float rod 114 and are adapted to engage an upper pin 115, or a lower pin 116 on the float rod. The float rod extends into the brine tank and is guided therein by means of a guide 118. This float rod has on its lower end a float 117. A handle 119 is inserted in a socket 120 in the lever bracket 96 for manipulating the lever and moving the plunger for operating the valve 66.

Figures 6, 7, 8:
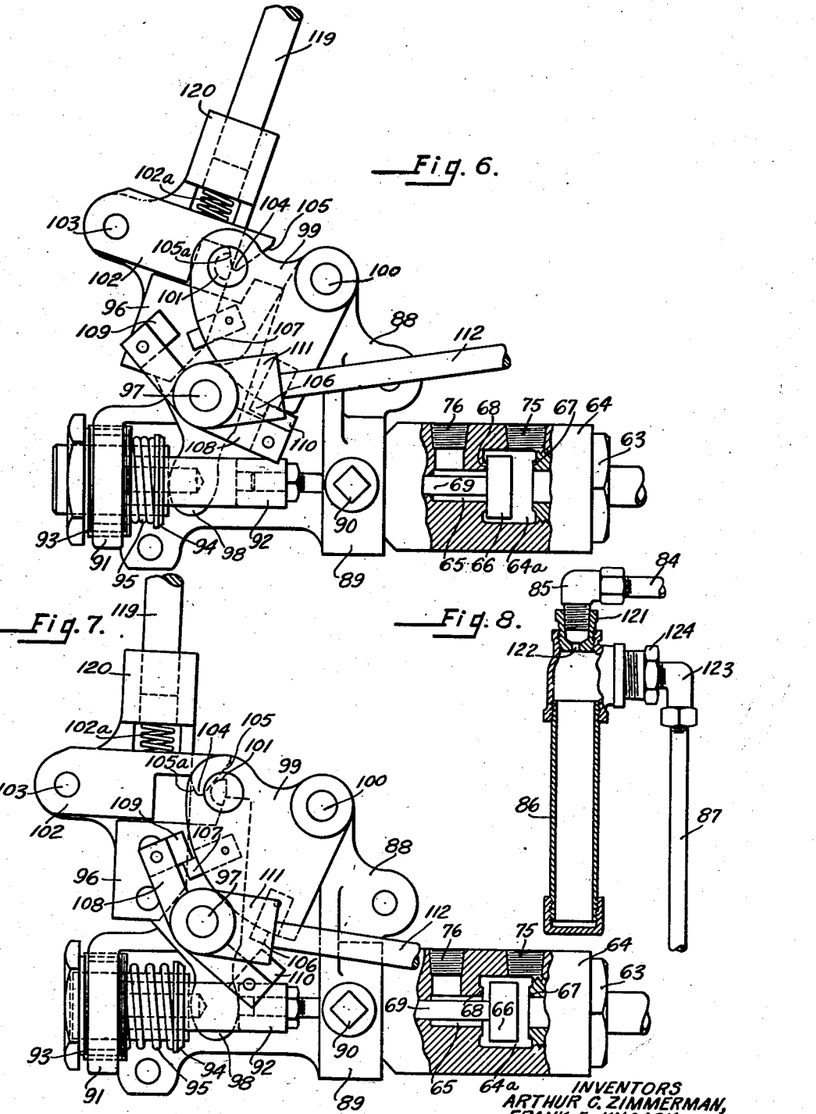
Figure 6 is a view similar to Figure 5 but with the parts in position for regenerating the softening material.
Figure 7 is a view similar to Figure 5 but with the parts automatically shifted from the position shown in Figure 6 to that shown in this figure, in which the water is directed for refilling the brine tank and rinsing the softening tank.
Figure 8 is a vertical section through a dirt trap connected to the brine pipe.

In Figure 8 the dirt trap is shown in vertical, longitudinal section. The plug 121 in the upper end of the trap has therein a restricted hole 122. The brine pipe leads from the brine tank to an elbow 123 connected to the dirt trap by means of a plug 124. The plug is located in the dirt trap closely adjacent the plug 121 and the hole 122 therein. The dirt trap provides a well of substantial depth extending below the top to catch dirt and other solid matter that may be in the brine tank. The brine drawn from the brine tank into the dirt trap enters the well and is checked in its movement therein so that foreign matter will drop to the bottom of the well, while the brine is discharged through the restricted opening.

In the position shown in Figure 5 the softener is in position for softening purposes. If it should be desired to regenerate the softening material in the softening tank the handle 119 is moved from the position shown in Figure 5 to that shown in Figure 6. When the handle 119 is in the position shown in Figure 6 the inlet into the chamber 64a is open but the restricted chamber is closed; because the valve engages the valve seat 68 the water will pass through the pipe 77 to the T-coupling 78. From this fitting a part of the water passes through the injector into the valve casing and draws brine from the brine tank so it can be fed into the softening tank for regenerating purposes.

Another part of this water from the pipe 77 passes through the T-coupling 78 and pipe 80, into the chambers for providing pressure upon the diaphragms to shift the valves so that both the inlet for hard water and the outlet for softened water are closed. This operation continues until the water in the brine tank has been reduced to such a low level that the lowering of the float will cause the upper pin 115 to engage the washer 113, thereby causing the escapement members to operate so that the handle will assume the position shown in Figure 7.

In Figure 6 it will be observed that the pin 106 is in engagement with the pallet 110 whereby the valve 66 is held against the seat 68. The lowering of the brine pulls the free end of the lever 112 down, thereby withdrawing the pallet 110 from the pin 106 and causing the pallet 109 to engage the pin 107 whereby the valve 66 is held free from its seats. In this position the valve 66 is substantially midway between the seats 67 and 68 so that water may pass from the chamber 64a, out through both of the outlets. The water passing through the pipe 82 enters the injector casing through the T-fitting 83, counteracting the injector force of the water entering the injector casing through the T-coupling 78, and causes the hard water to flow through the pipe 82 into the pipe 84 for refilling the brine tank, and through the injector casing for rinsing the softening tank.

This operation continues until the brine tank has become sufficiently full that it raises the lever 112 and withdraws the pallet 109 from the pin 107, when the parts through the operation of the spring 95 assume the position shown in Figure 5 and the apparatus is in water softening condition. The parts remain in this position until the handle 119 is manually operated for regenerating purposes. In removing the handle 119 from the position shown in Figure 5 to that shown in Figure 6 the pawl engages the pin 101. The pawl engages this pin until the downward movement of the float releases the pallet 110 from the pin 106.

The pin being released from the pawl, the spring 95 forces the plunger to the right, as shown in Figure 7, and positions the valve in substantially the center of the chamber 64a. All operations are automatic with the exception of the manual movement of the handle for starting the regenerating operation. The operating mechanism located on top of the brine tank is inclosed within the casing 3, which has a removable cover 126 through which the handle 119 extends by means of a slot 127. On the lever bracket 96 is a cam arm 96a. When the valve 66 is in the softening position in engagement with the seat 67 the pin 101 rests on top of this cam arm 96a, thereby supporting the arm 99 and the pin 101 so that the cam end of the pawl 102 will pass over the pin as the handle 119 is manually pushed to the right, as shown in Figure 5. When this handle 119 is pushed to its extreme right-hand position, as shown in Figure 6, the pin 101 engages the cam surface 105a on the pawl and at the same time the pallet 110 engages the pin 106 on its lower righthand side. Between the pawl 102 and the pallet 110 the arm 99 is held in a fixed position.

As the brine becomes lower in the brine tank the float lever 112 will be lowered, thereby releasing the pallet 110 from the pin 106 and bringing the pallet 109 in engagement with the pin 107, as shown in Figure 7. The handle 119 moves to the left, due to the action of the spring 95, when the pallet 110 is released from the pin 106.

When the parts are in the position shown in Figure 7 the arm 99 is held against movement in one direction by means of the pallet 109 and the pin 107, and on the other hand by means of the cam arm 96a engaging a cam surface 101a on the lower righthand side of the pin 101. While the parts are in the position shown in Figure 7 rinsing of the softening tank and the refilling of the brine tank are taking place. As the brine rises in the brine tank the lever 112 is elevated, thereby releasing the pin 107 from engagement with the pallet 109 and permitting the spring 95 to force the valve 66 against the seat 67, and at the same time forcing the handle 119 into its extreme lefthand position, as shown in Figure 5, where the pallet 110 is in position to engage the pin 106. The arm 99 is supported by the pin 101 on top of the cam arm 96a.

When the operator desires to regenerate the system, he forces the handle 119 in the desired direction and thereby sets the apparatus in regenerating position so that a portion of the hard water, acting through the injector, will apply the brine to the water softening material and continue this application until the float in the brine tank descends to such a point as to unlock the apparatus thus set. This results in killing the vacuum and cutting off the injection of brine, while permitting the flow of the hard water to wash the brine out of the mineral and at the same time the brine tank is refilled.

When the float rises to the filled position of the brine tank, then the handle 119 is restored to its initial position and so are the accompanying parts. The hard water pressure is used for controlling the soft water service and hard water inlet valves. The hard water is applied to the bottom of the mineral so that softening takes place by the water moving upwardly, while brining and washing take place downwardly.

It will be understood that it is desired to comprehend within this invention such modifications as come within the scope of the claims and the invention.

Having thus fully described the invention, what is claimed as new and desired to be secured by Letters Patent, is:

1. In a water softener, a brine tank, means comprising a softening tank to provide a water passageway, mechanical means to divert part of the water from the passageway, means operated by said diverted water to close the passageway and cause a flow of brine through the softening tank for regeneration, means operated by the fall of the brine in the brine tank to divert water from the passageway to stop the flow of brine and refill the brine tank, and means operated by the rise of brine in the brine tank to cut off all of the diverted water, whereby the passageway is again open.

2. In a water softener, a brine tank, means comprising a softening tank to provide a water passageway, mechanical means to divert part of the water from the passageway, means operated by said diverted water to close the passageway and cause a flow of brine through the softening tank for regeneration, means operated by the fall of the brine in the brine tank to divert more water from the passageway to stop the brine flow to refill the brine tank and to rinse the brine from the softening tank, and means operated by the rise of brine in the brine tank to cut off all of the diverted water, whereby the passageway is again open.

3. In a water softener, a brine tank, means comprising a water passageway including a softening tank, a casing having therein a chamber in communication with the passageway, a water inlet for said casing, said chamber having a first outlet adapted to supply water to close the passageway and force brine from the brine tank through the softening tank, said chamber also having a second outlet adapted to supply water to stop the brine flow and also to refill the brine tank and to rinse the softening tank, a valve member in said casing, mechanical means to move the valve member to open communication between the water inlet and the first outlet and to close communication between the water inlet and the second outlet, and automatic means to move the valve member to open communication between said water inlet and the second outlet and thereafter to move the valve member to close communication between said water inlet and said first outlet.

4. In a water softener, a brine tank, means comprising a softening tank to provide a water passageway, a float in the brine tank, means to divert a part of the water from the passageway, means operated by the diverted water to close the passageway and to force brine from the brine tank through the softening tank, and means operated by the float to divert another part of the water from the passageway to refill the brine tank and rinse the softening tank.

5. In a water softener, a brine tank, means comprising a water passageway including a softening tank, a valve in the passageway before it enters the softening tank and another valve in the passageway after it leaves the softening tank, a drain pipe connected to the passageway beyond one valve from the softening tank, a brine pipe leading from the brine tank into the passageway between the other valve and the softening tank, means to divert a part of the water from the passageway, means operated by the diverted water to move the valves to close the passageway, means operated by the diverted water to draw brine from the brine tank and force it into the softening tank and out at the drain pipe, and means operated by the brine in the tank to divert more of the water from the passageway to refill the brine tank and rinse the softening tank.

6. In a water softener, a brine tank, means comprising a water passageway including a softening tank, a valve in the passageway before it enters the softening tank and another valve in the passageway after it leaves the softening tank, a drain pipe connected to the passageway beyond one valve from the softening tank, a brine pipe leading from the brine tank into the passageway between the other valve and the softening tank, means to divert a part of the water from the passageway, means operated by the diverted water to move the valves to close the passageway, means operated by the diverted water to draw brine from the brine tank and force it into the softening tank and out at the drain pipe, and means operated by the brine in the tank to divert more of the water from the passageway to refill the brine tank and rinse the softening tank, said second-named means and said last-named means comprising a common valve.

7. In a water softener, a brine tank, means comprising a water passageway including a softening tank, a valve in the passageway before it enters the softening tank and another valve in the passageway after it leaves the softening tank, a drain pipe connected to the passageway beyond one valve from the softening tank, an injector in the passageway between the other valve and the softening tank, a pipe connecting the brine tank to the injector, means to divert a part of the water from the passageway to the injector to draw brine from the brine tank and to force it through the softening tank and out at the drain pipe, means operated by the diverted water to move the valves to close the passageway, and means to divert another part of the water from the passageway to the injector to refill the brine tank and rinse the softening tank, said second-named means and the last-named means comprising a common valve.

8. In a water softener, a brine tank, means comprising a water passageway including a softening tank, a valve in the passageway before it enters the softening tank and another valve in the passageway after it leaves the softening tank, a drain pipe connected to the passageway beyond one valve from the softening tank, an injector in the passageway between the other valve and the softening tank, said injector having in one side one arm of a T-fitting, a valve casing having a chamber, said casing having an inlet connected to the passageway by a pipe, said casing having two outlets, one outlet connected to the end of the injector by a pipe and the other outlet connected to one arm of the T-fitting in the side of the injector, a pipe from the brine tank to the other arm of the T-fitting, a valve in the casing normally closing the inlet, mechanical means to move the valve to open the inlet and close one outlet, whereby water from the passageway acts on the injector to force brine through the softening tank, means operated by the water from the passageway to close the passageway valves, and means to automatically move the valve to open the closed outlet, whereby water is admitted to the injector to refill the brine tank and to the softening tank to rinse it.

9. In combination, a brine tank, means to provide a passageway for water, a valve casing with a chamber therein having an inlet connected to the passageway, an injector in said passageway, said casing having a pair of outlets, a pipe connecting one outlet to the end of the injector, a pipe connecting the other outlet to one side of the injector and to the brine tank, a valve in the chamber, means tending to hold the valve in a position to close the inlet, manually operated means to move the valve to open the inlet and close one outlet, whereby water will enter the injector to draw brine from the tank, means operated by the water to the injector to cut off that portion of the passageway into which brine is injected, and means operated by the brine in the tank reaching a low level to move the valve to open the other outlet to refill the brine tank.

10. In combination, a brine tank, means to provide a passageway for water, a valve casing with a chamber therein having an inlet connected to the passageway, an injector in said passageway, said casing having a pair of outlets, a pipe connecting one outlet to the end of the injector, a pipe connecting the other outlet to one side of the injector and to the brine tank, a valve in the chamber, means tending to hold the valve in a position to close the inlet, manually operated means to move the valve to open the inlet and close one outlet, whereby water will enter the injector to draw brine from the tank, means operated by the water to the injector to cut off that portion of the passageway into which brine is injected, means operated by the brine in the tank reaching a low level to move the valve to open the other outlet to refill the brine tank, and means operated by the brine as it fills the tank to cause the valve to close the inlet.

11. In combination, a brine tank, means forming a passageway, an injector in said passageway, a casing forming a chamber having an inlet and a pair of outlets, a pipe connecting the passageway to the inlet, a pipe connecting the injector to the brine tank and to one outlet, a pipe connecting the other outlet to the injector to draw brine from the tank, a valve in the chamber normally closing the inlet, manually operated means to move the valve to open the inlet and close said one outlet, whereby brine is drawn from the brine tank into the passageway, means operated by the water from said one outlet to cut off that portion of the passageway into which the brine is forced, means operated by the low level of the brine in the tank to cause the valve to move to open the other outlet, means to stop the valve before it closes the inlet, whereby the brine tank is refilled and the passageway is rinsed, and means operated by a high level of the brine to release the stop, whereby the inlet is closed and the passageway is opened.

12. In a water softener, a brine tank, means including a softening tank to provide a passageway, a casing chamber having an inlet connected to the passageway, said chamber having a pair of outlets, a pair of valves for cutting off the softening tank from the other parts of the passageway, a valve in the chamber, means tending to hold the last-named valve in a position to close the inlet, manually operated means to move the last-named valve to open the inlet and close one outlet, whereby water is diverted from the passageway, means to hold the valve thus moved, means operated by the diverted water to move the pair of valves to cut off the softening tank and force brine from the brine tank through the softening tank, means operated by the brine as it reaches a low level in the brine tank to release the holding means, whereby the closed outlet is opened and other water is diverted from the passageway, means to automatically stop and hold the valve so that the inlet and both outlets are open, means operated by the water through the once closed outlet to refill the brine tank and rinse the softening tank, and means operated by the rising of the brine in the brine tank to release the stop, and holding means to close the inlet to the chamber, whereby the passageway is open through the softening tank.

13. In a water softener, a brine tank, means forming a water passageway, means to force brine into the passageway, means to prevent the brine from flowing into the passageway, said last two means including a casing chamber having an inlet connected to the passageway and a pair of outlets, a valve in the chamber, a spring tending to hold the valve in position to close the inlet, manual means to move the valve to open the inlet and close one outlet, whereby brine is forced from the brine tank into the passageway, means to lock the valve thus moved, means operated by the brine as it reaches a lower level to release the lock means, whereby the closed inlet is opened and the flow of brine is counteracted and stopped, means to automatically stop and hold the valve so that the inlet and both outlets are open, and means operated by the rising of the brine in the brine tank to release the stop and hold the means whereby the inlet is closed.

14. In a water softener, a brine tank, means forming a water passageway, means to force brine into the passageway, means to prevent the brine from flowing into the passageway, said last two means including a casing chamber having an inlet connected to the passageway and a pair of outlets, a valve in the chamber, a spring tending to holding the valve in position to close the inlet, manual means to move the valve to open the inlet and close one outlet, whereby brine is forced from the brine tank into the passageway, means to lock the valve thus moved, a float operated by the brine as it reaches a lower level to release the lock means, whereby the closed inlet is opened and the flow of brine is counteracted and stopped, means to automatically stop and hold the valve so that the inlet and both outlets are open, and a float operated by the rising of the brine in the brine tank to release the stop and hold the float whereby the inlet is closed.

15. In a method of water softening, cutting off the soft water supply, reversing the direction of water through the water softening material, injecting brine with the water, cutting off the brine injection when a predetermined quantity of brine has been applied as determined by the quantity of the brine, utilizing a part of the water to replenish the brine while continuing the flow of the hard water to wash the water softening material; cutting off the refill water to the brine when a predetermined quantity has been delivered, using this predetermined quantity as the means for likewise reversing the direction of flow of water through the water softening material, and again opening the connection of the water leaving the softening material to a service line as soft water.

16. In a method of water softening in which the softening takes place by the upward movement of hard water and washing and brining take place with the downward movement of hard water through the softening material, manually setting the parts for reversing the direction of water from upward softening to downward brining, injecting brine with the downwardly moving hard water, cutting off the brine and restoring the brine to its original quantity when the quantity of brine has decreased a predetermined amount, and finally cutting off the refilling of the brine, stopping the washing of the softening material and restoring the connection to service and reversing the direction of the water upon restoring the brine to its original quantity.

17. In combination, a casing forming a valve chamber having an inlet and a pair of outlets, a valve in the chamber adapted to close the inlet or one outlet, means tending to hold the valve in position to close the inlet, means to move the valve to open the inlet and close the outlet, means to lock said last-named means to hold the valve so moved, and means operated as a consequence of water flowing through the casing to release the lock means to open the closed outlet.

18. In combination, a casing forming a valve chamber having an inlet and a pair of outlets, a valve in the chamber adapted to close the inlet or one outlet, a spring tending to hold the valve in position to close the inlet, means to move the valve to open the inlet and close the outlet, means to lock said first-named means to hold the valve so moved, means operated as a consequence of water flowing through the casing to release the lock means to open the closed outlet and lock said first-named means with the valve in such position the inlet and the outlet are open, and means operated as a consequence of water flowing through the casing to entirely release the first-named means to close the inlet.

19. In combination, a casing forming a valve chamber having an inlet and a pair of outlets, a valve in the chamber adapted to close the inlet or one outlet, a spring tending to hold the valve in position to close the inlet, a bracket on the casing, an arm pivoted on the bracket, an escapement lever pivoted on the bracket, a main lever pivoted on the bracket to move the valve to open the inlet and close the outlet, means on the arm acting on the main lever and on the escapement lever to lock the main lever in position so the inlet is open and the outlet is closed, means to move the escapement in one direction to release said means, whereby the outlet is opened, means on the main lever and the escapement lever to stop and hold the main lever so that the inlet and the outlet are open, and means to move the escapement lever in another direction to release the stop and holding means whereby the valve will close the inlet.

20. In combination, a casing forming a valve chamber having an inlet and a pair of outlets, a valve in the chamber adapted to close the inlet or one outlet, a spring tending to hold the valve in position to close the inlet, a bracket on the casing, an arm pivoted on the bracket, an escapement lever pivoted on the bracket, a main lever pivoted on the bracket to move the valve to open the inlet and close the outlet, means on the arm acting on the main lever and on the escapement lever to lock the main lever in position so that the inlet is open and the outlet is closed, means to move the escapement in one direction to release said means whereby the outlet is opened, means on the main lever and the escapement lever to stop and hold the main lever so the inlet and the outlet are open, and means to move the escapement lever in a reverse direction to release the stop and holding means whereby the valve will close the inlet.

21. In combination, a casing forming a valve chamber having an inlet and a pair of outlets, a valve in the chamber adapted to close the inlet or one outlet, a spring tending to hold the valve in position to close the inlet, a bracket on the casing, an arm pivoted on the bracket, an escapement lever pivoted on the bracket, a main lever pivoted on the bracket to move the valve to open the inlet and close the outlet, means on the arm acting on the main lever and on the escapement lever to lock the main lever in position so the inlet is open and the outlet is closed, means to move the escapement to release said means, whereby the outlet is opened, means on the main lever and the escapement lever to stop and hold the main lever so the inlet and the outlet are open, and means to move the escapement lever to release the stop and holding means whereby the valve will close the inlet.

22. In combination with a tank and a source of water under pressure, a casing forming a chamber having an inlet connected to said source of water and a pair of outlets; one outlet being always open to the tank for taking water therefrom and the other outlet connected to the tank to refill it but adapted to be closed, a valve in the chamber adapted to close the inlet and said other outlet, a spring tending to hold the valve in a position to close the inlet, a main lever to move the valve to open the inlet and close said other outlet, an escapement lever, an arm cooperating with said levers to lock the main lever in a position to hold the inlet open and said other outlet closed so that water will pass through said one outlet to take water from the tank, means operated by the lowering of the water in the tank to move the escapement lever to release the main lever, whereby said other outlet is opened, cooperating means on the main lever and on the escapement lever to stop and hold the main lever and the valve so the inlet and said other outlet are open, whereby the tank is refilled, and means operated by the rising of the water to move the escapement lever to disconnect said cooperating means so the valve will close the inlet after the water in the tank has reached a certain height.

23. In combination with a supply pipe, a service pipe, a softening tank and a brine tank, a valve casing forming a chamber connected to one end of the softening tank, to the brine tank and to the service pipe, said casing forming a second chamber connected to the supply pipe and to the other end of the softening tank and having a drain outlet, a valve in each chamber, means tending to hold the valves in positions to close off the brine tank and the drain outlet, and a common instrumentality to move the valves to shut off the service pipe and the supply pipe and force brine from the brine tank through the softening tank and out through the drain outlet.

24. In combination with a supply pipe, a service pipe, a softening tank and a brine tank, a valve casing forming a chamber connected to one end of the softening tank, to the brine tank and to the service pipe, said casing forming a second chamber connected to the supply pipe and to the other end of the softening tank and having a drain outlet, a valve in each chamber, means tending to hold the valves in positions to close off the brine tank and the drain outlet, a common instrumentality to move the valves to shut off the service pipe and the supply pipe and force brine from the brine tank through the softening tank and out through the drain outlet, and means operated by the lowering of the brine in the brine tank to refill the brine tank and rinse the softening tank.

25. In combination with a supply pipe, a service pipe, a softening tank and a brine tank, a valve casing forming a chamber connected to one end of the softening tank, to the brine tank and to the service pipe, said casing forming a second chamber connected to the supply pipe and to the other end of the softening tank and having a drain outlet, a valve in each chamber, means tending to hold the valves in positions to close off the brine tank and the drain outlet, a common instrumentality to move the valves to shut off the service pipe and the supply pipe and force brine from the brine tank through the softening tank and out through the drain outlet, means operated by the lowering of the brine in the brine tank to refill the brine tank and rinse the softening tank, and means operated by the rising of brine in the brine tank to cause the valves to move to open the service pipe and the supply pipe.

26. In combination with a supply pipe, a service pipe, a softening tank and a brine tank, a valve casing forming a chamber having a connection to one end of the softening tank, to the brine tank and to the service pipe, said connection to the brine tank comprising an injector, said casing forming a second chamber connected to the supply pipe and to the other end of the softening tank and having a drain outlet, a valve in each chamber, means tending to hold the valves in positions to close off the brine tank and the drain outlet, a second valve casing forming a chamber having an inlet connected to the supply pipe, an outlet connected to the injector, and a second outlet connected to the injector to operate in opposition to the first outlet, a valve in the last-named valve chamber adapted to close the inlet or the second outlet, a spring tending to hold the last-named valve in position to close the inlet, manually operated means to move the last-named valve to open the inlet and close the second outlet, whereby the first-named valves are moved to shut off the supply pipe and the service pipe and brine is forced through the injector, through the softening tank and out at the drain, and means operated by the falling and rising of the brine in the brine tank to first rinse the softening tank and refill the brine tank and thereafter to move the valves to open the supply pipe and the service pipe.

ARTHUR C. ZIMMERMAN.
FRANK E. KNAACK.